(12) United States Patent
Schreyer et al.

(10) Patent No.: US 6,279,978 B1
(45) Date of Patent: Aug. 28, 2001

(54) WORK VEHICLE ROOF STRUCTURE

(75) Inventors: Bernard Eugene Schreyer; Daniel Joseph Mueller, both of Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/412,913

(22) Filed: Oct. 5, 1999

(51) Int. Cl.⁷ ..................................................... B62D 33/00
(52) U.S. Cl. .................. 296/39.3; 296/214; 296/190.03; 454/137
(58) Field of Search ..................................... 296/214, 208, 296/39.3, 190.03, 102; 454/136, 137

(56) References Cited

U.S. PATENT DOCUMENTS

| | | |
|---|---|---|
| 3,532,377 * | 10/1970 | Grasseler . |
| 3,868,896 | 3/1975 | Doll et al. . |
| 4,088,364 | 5/1978 | Termont . |
| 4,097,085 * | 6/1978 | Nelson . |
| 4,189,987 * | 2/1980 | Amberg et al. . |
| 4,660,462 | 4/1987 | Thompson et al. . |
| 4,721,031 | 1/1988 | Nakata et al. . |
| 4,731,151 * | 3/1988 | Kaller et al. . |
| 4,807,523 * | 2/1989 | Radtke . |
| 5,280,955 * | 1/1994 | Nelson et al. . |
| 5,383,815 | 1/1995 | Kiesel et al. . |
| 5,636,867 * | 6/1997 | McNabb et al. . |
| 5,820,199 * | 10/1998 | Camplin et al. . |
| 5,913,566 * | 6/1999 | Stauffer et al. . |
| 5,921,619 * | 6/1999 | Cederberg et al. . |
| 5,942,321 * | 8/1999 | Romesberg et al. . |
| 6,033,756 * | 3/2000 | Handscomb . |
| 6,062,635 * | 5/2000 | Learman et al. . |
| 6,086,145 * | 6/2000 | Wandyez . |

* cited by examiner

Primary Examiner—Joseph D. Pape
Assistant Examiner—Scott Carpenter

(57) ABSTRACT

The operator's cab of a work vehicle is provided with a ROPS on which is mounted a roof structure. The roof structure is provided with a roof having a top surface exposed to the outside and a bottom surface facing the interior of the operator's compartment. A sound insulating foam liner having a top surface and a bottom surface is located under the roof. The top surface of the foam liner is secured to the bottom surface of the roof by adhesives. The bottom surface of the foam liner is provided with ventilating channels. The ventilating channels have two sidewalls and a top wall extending between the sidewalls. A headliner is located below the foam liner. The headliner has a top surface facing the bottom surface of the foam liner and a bottom surface facing the interior of the operator's compartment. The top surface of the headliner encloses the ventilating channels formed in the foam liner thereby forming ventilating ducts. The top surface of the headliner forming the bottom wall, whereas the foam liner forms the two sidewalls and the top wall of the ventilating duct.

20 Claims, 4 Drawing Sheets

WORK VEHICLE ROOF STRUCTURE

BACKGROUND OF THE INVENTION

1. Field of the Invention

The invention is directed to the roof structure of a work vehicle wherein the sound insulating foam liner together with the headliner form ventilating ducts through which airflow from a HVAC system passes.

2. Description of the Prior Art

The operator's compartment on work vehicles used in construction, agriculture mining and forestry operations is typically provided with a roll over protection system (ROPS). In addition to protecting the operator, the operator's compartment performs many other functions. The compartment must conform to various standards and regulations for operator noise comfort, visibility and interior size. As such, the operator's compartment includes sound absorbing materials to reduce noise levels in the compartment. In addition, the operator's compartment maybe provided with a heating, ventilating and air conditioning system (HVAC) to maintain a comfortable operator work environment. The HVAC system can be mounted in the roof structure of the operator's compartment. The air is routed through a series of ducts that are usually formed of molded plastic and are provided with additional insulation to reduce heat transfer from and to the air in the duct. The ducts are usually attached to each other, the HVAC unit, to the insulation and the roof structure by various mechanical mechanisms.

Typically separate components are used for sound absorption and HVAC airflow distribution functions. Sound absorption is accomplished by adhering or mechanically fastening foam sheets to either the roof or bonding them to the headliner.

SUMMARY OF THE INVENTION

It is an object of the present invention to provide a roof structure for an operator's cab that requires less parts and is less costly to manufacture.

It is an object of the present invention to provide a HVAC system wherein the ventilating ducts have reduced airflow noise.

It is an object of the present invention to provide a HVAC system wherein the ventilating ducts have reduced condensation.

It is a feature of the present invention that a sound insulating foam liner and the headliner form ventilating ducts through which ventilating air from the HVAC system is directed.

The operator's cab of a work vehicle is provided with a ROPS on which is mounted a roof structure. The roof structure is provided with a roof having a top surface exposed to the outside and a bottom surface facing the interior of the operator's compartment. A sound insulating foam liner having a top surface and a bottom surface is located under the roof. The top surface of the foam liner is secured to the bottom surface of the roof by adhesives. The bottom surface of the foam liner is provided with ventilating channels. The ventilating channels have two sidewalls and a top wall extending between the sidewalls. A headliner is located below the foam liner. The headliner has a top surface facing the bottom surface of the foam liner and a bottom surface facing the interior of the operator's compartment. The top surface of the headliner encloses the ventilating channels formed in the foam liner thereby forming ventilating ducts. The top surface of the headliner forming the bottom wall, whereas the foam liner forms the two sidewalls and the top wall of the ventilating duct.

DESCRIPTION OF THE PREFERRED EMBODIMENT

Figure 1:
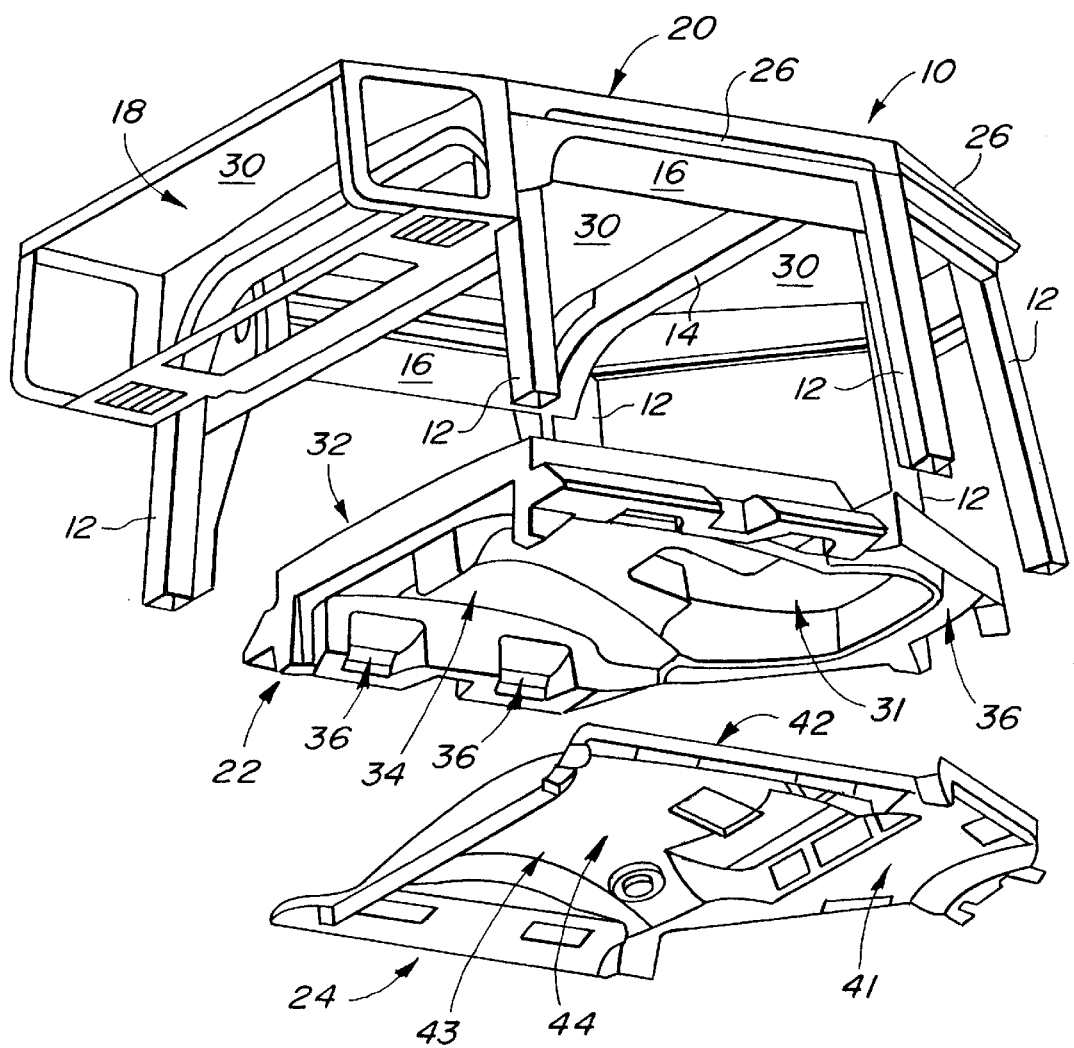
FIG. 1 is an exploded perspective view of the roof structure of an operator's compartment.
Figure 2:
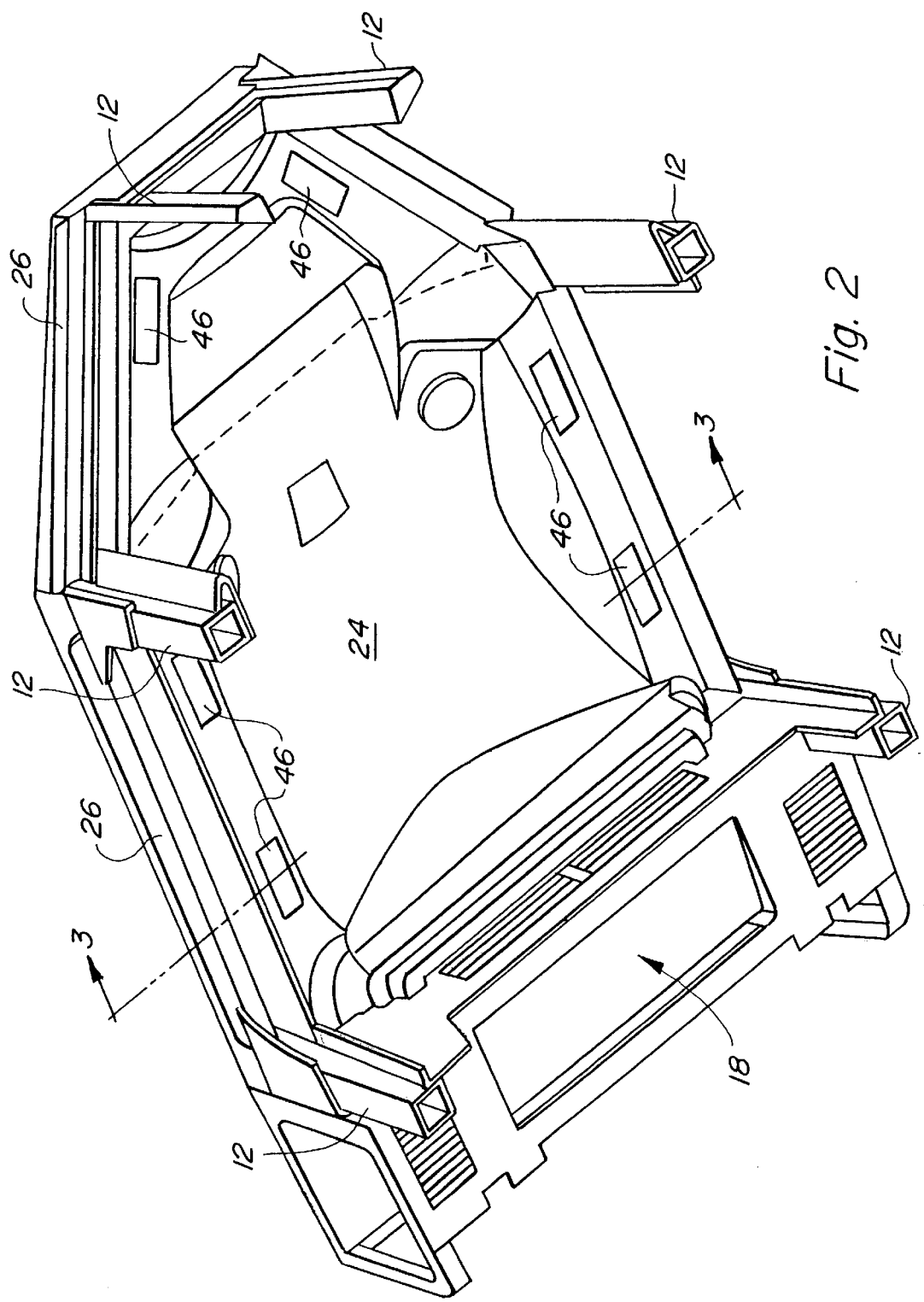
FIG. 2 is a perspective view of the roof structure of the operator's compartment the roof structure being provided with a headliner duct.

FIG. 1 illustrates the roof structure 10 of an operator's compartment for a work vehicle. The operator's compartment is defined by six vertically extending posts 12. Four of the posts 12 are tubular members that extend into horizontally extending members 14 forming the ROPS for the compartment. Two flanges 16 extend between two pairs of ROPS posts 12 downwardly from the corresponding horizontal extending members 14. The openings between the ROPS posts are provided with windows 17 (only shown in FIG. 3) and doors (not shown). A HVAC compartment 18 is located to the rear of the operator's compartment and is designed to hold a HVAC unit, not shown.

The operator's compartment is provided with a roof structure having three main components, a roof 20, a rigid sound insulating foam liner 22, and a headliner 24. In the preferred embodiment the roof is formed of sheet metal and is welded to the steel horizontally extending 14 members of the ROPS. The roof 20 also extends over the HVAC compartment 18 and is provided with drip channels 26. The roof has a top surface 28 facing the outside and a bottom surface 30 facing the interior of the operator's compartment.

The sound insulating foam liner 22 is located below the roof 20 and is formed from a polyurethane expanding foam or some similar material. The foam liner is manufactured or molded to fill the cavity formed below the roof with sound absorbing material. The foam liner could be a single part or be made up of several parts. A central forward section 31 is left open to accommodate HVAC controls and/or a radio in the roof structure. The top surface 32 of the foam liner 22 is fixed to the bottom surface 30 of the roof by adhesives. In addition, the expansion of the foam and adhesives secure the foam liner 22 to the flanges 16. The bottom surface 34 of the foam liner is provided with ventilating channels 36 having sidewalls 38 and top walls 40. These ventilating channels 36 can be placed and sized for proper air velocity and distribution. In addition, the foam reduces the airflow noise level of the HVAC system as air is moving through the ventilating channels 36.

Located immediately below the foam liner 22 is the headliner 24. The headliner is porous so that noise from the interior of the operator's compartment can be deadened by the foam liner. The headliner 24 comprises two pieces a front half 41 and a back half 43. The headliner has a top surface 42 facing the foam liner 22 and a bottom surface 44 facing the interior of the operator's compartment. The headliner 24 cooperates with the ventilating channels 36 formed in the foam liner 22 to form ventilating ducts. The headliner 24 enclosing the ventilating channels 36 by forming the bottom wall. To better seal the ventilating ducts the foam liner may be provided with molded in raised edges to increase its sealing effect when the foam liner is compressed into place. The headliner is provided with louvered vents 46 that are in pneumatic communication with the ventilating ducts to direct air into and from the interior of the operator's compartment.

Figure 3:
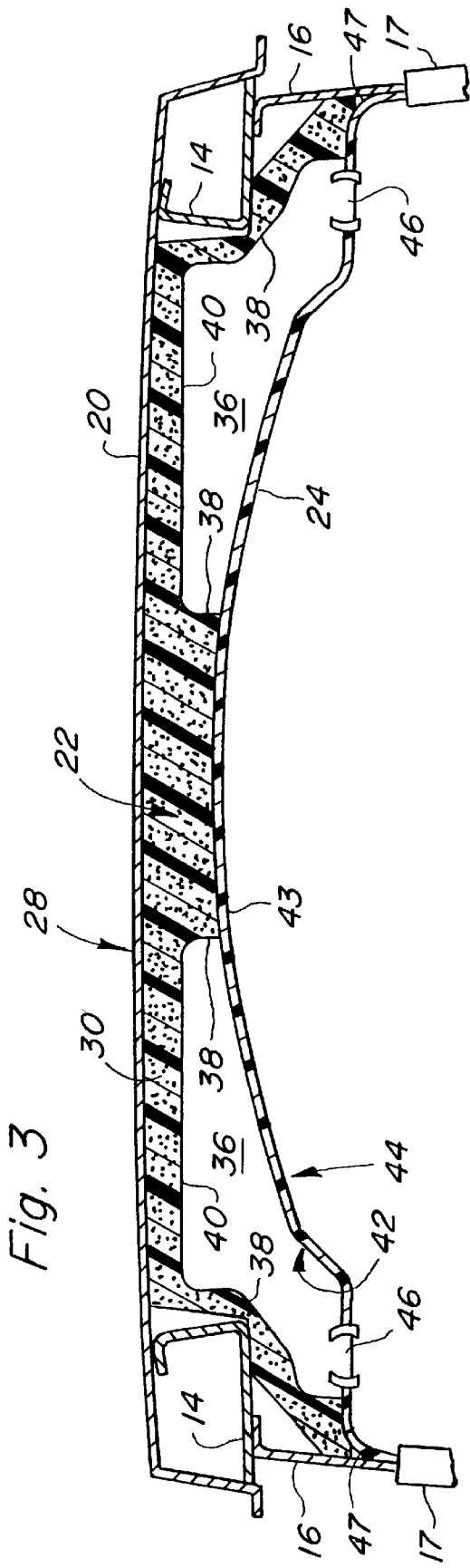
FIG. 3 is a cross sectional view taken along line 3—3 in FIG. 2.
Figure 4:
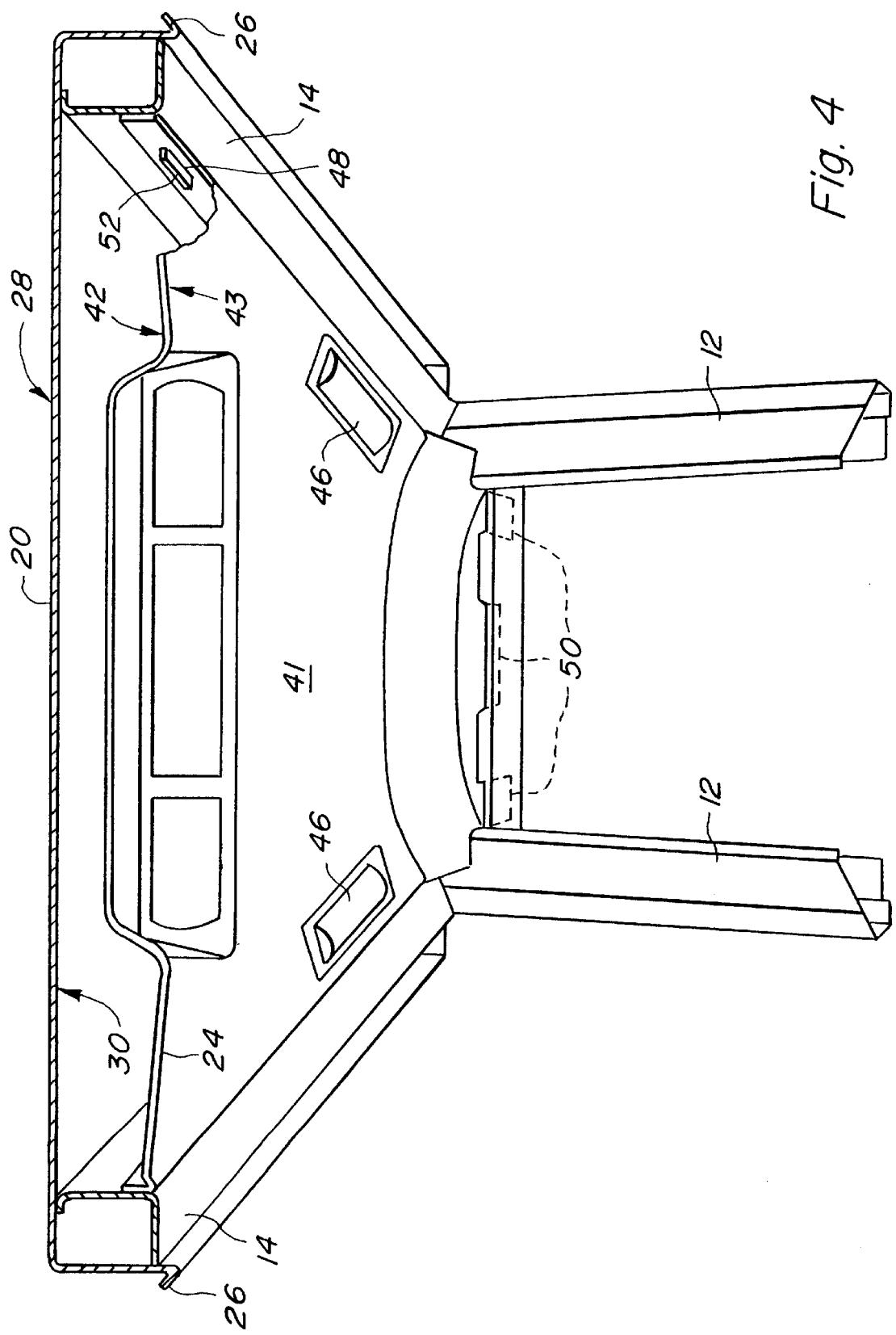
FIG. 4 is a cross sectional view of the roof structure without the foam liner which has been eliminated for illustration purposes.

The side edges 47 of the back half 43 of the headliner 24 rests on the top edges of windows 17 as seen in FIG. 3. The front half 41 of the headliner 24 is provided with side slots 48 and tabs 50 for supporting the headliner. The side slots 48 engages tabs 52 mounted to the horizontal members of the ROPS as shown in FIG. 4. Whereas tabs 50 are inserted into apertures formed in the ROPS also shown in FIG. 4. It should be noted that the foam liner has not been illustrated in FIG. 4 to better illustrate the headliner mounting structure.

The headliner's primary function is noise reduction and it is constructed of a conventional porous material to let sound from the interior of the operator's compartment pass through to the sound absorbing foam liner when the sound is deadened. This reduces operator's station noise level. The headliner's secondary function is to be the bottom wall of the ventilating ducts for the HVAC system, and retain the adjustable or fixed louvers for operator controlled or directed airflow.

The invention should not be limited by the above described embodiment, but should be limited solely by the claims that follow:

We claim:

1. A roof structure for an operator's compartment for a work vehicle, the roof structure comprising
   a roof having a top surface facing the outside and a bottom surface facing the operator's compartment,
   a sound insulating foam liner located below the roof, the insulating foam liner having a top surface which adjoins the roof and a bottom surface, the sound insulating foam liner forming side walls and top walls that define ventilating channels; and
   a headliner located below the sound insulating foam liner, the headliner having a top surface which covers the ventilating channels thereby forming ventilating ducts through which ventilating air can pass, the headliner is also provided with vents that are in pneumatic communication with the ventilating passages for directing ventilating air into the operator's compartment.

2. A roof structure as defined by claim 1 wherein the top surface of the sound insulating foam liner is secured to the roof.

3. A roof structure as defined by claim 2 wherein the top surface of the insulating foam liner is secured to the roof by adhesives.

4. A roof structure as defined by claim 2 wherein the headliner is porous.

5. A roof structure as defined by claim 4 wherein the sound insulating foam liner comprises polyurethane expanding foam.

6. A roof structure as defined by claim 5 wherein the sound insulating foam liner is a single piece.

7. A roof structure as defined by claim 6 wherein the headliner comprises two portions a front half and a back half.

8. A roof structure as defined by claim 7 wherein the back half has side edges for mounting the headliner to the operator's compartment.

9. A roof structure as defined by claim 8 wherein the front half is provided with mounting slots and tabs for mounting the front half to the operator's compartment.

10. An operator's compartment for a work vehicle, the operator's compartment comprising:
    a ROPS structure comprising vertically extending posts and horizontally extending members extending between the posts;
    a roof mounted to the ROPS structure, the roof having a top surface and a bottom surface;
    a sound insulating foam liner located below the roof, the insulating foam liner having a top surface which adjoins the roof and a bottom surface, the sound insulating foam liner forming sidewalls and top walls that define ventilating channels; and
    a headliner located below the sound insulating foam liner, the headliner having a top surface which covers the ventilating channels thereby forming ventilating ducts through which ventilating air can pass, the headliner is also provided with vents that are in pneumatic communication with the ventilating passages for directing ventilating air into the operator's compartment.

11. An operator's compartment as defined by claim 10 wherein the sound insulating foam liner is secured to the roof by adhesives.

12. An operator's compartment as defined by claim 11 wherein the headliner is secured to the ROPS by mechanical mechanisms.

13. An operator's compartment as defined by claim 10 wherein the rear of the ROPS structure is provided with a HVAC compartment for housing a HVAC unit.

14. An operator's compartment as defined by claim 13 wherein the roof extends over the HVAC compartment.

15. An operator's compartment as defined by claim 14 wherein the sound insulating foam liner is a single piece.

16. An operator's compartment as defined by claim 15 wherein the headliner is porous.

17. An operator's compartment as defined by claim 16 wherein the sound insulating foam liner comprises polyurethane expanding foam.

18. A roof structure as defined by claim 14 wherein the headliner comprises two portions, a front half and a back half.

19. A roof structure as defined by claim 18 wherein the back half has side edges for mounting the headliner to the operator's compartment.

20. A roof structure as defined by claim 19 wherein the front half is provided with mounting slots and tabs for mounting the front half to the operator's compartment.

* * * * *